Oct. 31, 1967 — C. R. HUGHES — 3,350,107

EXPANDING ARBOR

Filed June 1, 1965

INVENTOR.
CHARLES R. HUGHES
BY Fulwider, Patton, Rieber
Lee, and Utecht
ATTORNEYS

United States Patent Office

3,350,107
Patented Oct. 31, 1967

3,350,107
EXPANDING ARBOR
Charles R. Hughes, 1650 Superior Ave.,
Costa Mesa, Calif. 92627
Filed June 1, 1965, Ser. No. 460,076
7 Claims. (Cl. 279—2)

My invention relates in general to arbors for holding workpieces in machine tools, more particularly to arbors of the expanding type designed to hold the work by internal pressure created by mechanical expansion of the arbor within the work, and in one embodiment to a combined collet and expanding arbor of this type. The present arbor constitutes an improvement over those disclosed in the patent issued to William K. Rieber on Jan. 18, 1949, No. 2,459,453, entitled, "Expanding Arbor," and assigned to me.

The arbors illustrated in the Rieber patent are so constructed that the minimum internal diameter of the workpiece which can be supported by the arbor is relatively large as the arbor end cannot readily be machined to small external dimensions for the mounting and supporting of workpieces with small internal dimensions. Further, in the arbor of the above Rieber patent it is difficult to hold the arbor rigidly in a collet or the headpiece of a lathe, or the like, while machining or turning the end of the arbor to the desired external dimension for insertion in the workpiece. The one-piece construction of the patented arbor not only contributes to the above deficiencies, but itself presents difficulties of construction and formation.

The expanding arbor of the present invention provides a new and improved construction which is sectional but may be easily assembled into an arbor or combined collet and arbor in which the slots in the face of the arbor are substantially closed in its non-stressed condition. The end of the arbor may therefore be machined or turned to small dimensions to hold workpieces with small internal dimensions or diameters. The work holding end of the collet may be rigidly clamped in a machine tool for the machining or turning operation.

It is therefore one of the objects of the present invention to provide an improved expanding arbor construction formed of segments and sections which may be preformed and easily assembled together to provide a cylindrical arbor construction.

Another object of this invention is the provision of an improved expanding arbor having end segments which substantially touch each other at the face of the arbor to permit a work holding arbor end of minimal diameter.

A further object of the present invention is the provision of an improved expanding arbor having a segmental end, with the segments substantially touching to permit the arbor to be rigidly held in a machine tool for machining the arbor end to the desired external dimension.

Yet another object of this invention is the provision of an improved expanding arbor of segmental construction with slots between the segments of varied width, the segments substantially engaging adjacent the work supporting end and being of substantial width at the opposite side of the fulcrum about which the segments rotate.

These and other objects and features of the invention will be readily apparent to those skilled in the art from the following specification and the appended drawing, in which.

Figure 1:
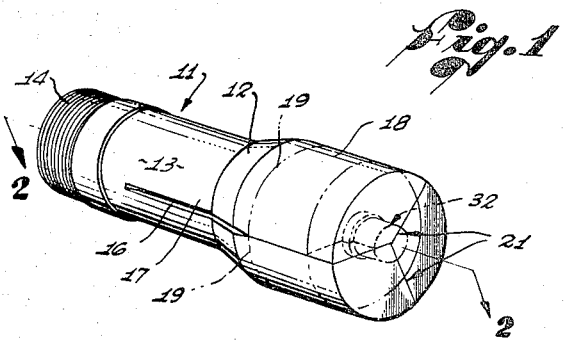
FIGURE 1 is a perspective view of a combined collet and arbor blank according to the present invention prior to machining of the arbor end to the desired work holding dimension.

The specific embodiment of the invention illustrated in the drawing is an expanding arbor indicated generally at 11 which, by means of the conical surface 12 mounted rearwardly of the fulcrum point about which the arbor expands, becomes a combined collet and arbor in its operation. The surface 12 may obviously be omitted where a simple arbor function is desired with the arbor expanded by means of a separate collet, these alternate constructions being fully disclosed in the Reiber patent above-identified.

The rear or supported portion of the arbor is preferably in the form of a tube 13 having its rear end threaded at 14 to mount the arbor, for example to a drawbar 15. The tube 13 is desirably of a resilient metallic material, such as steel, and the forward portion thereof has any desired number of slots 16, here selected as three to provide three forward end fingers 17 separated by the slots 16. The forward end of the arbor is constituted by a plurality of elements 18 equal in number with the fingers 17 and having their planes of demarcation aligned with the slots 16. The elements 18 may be formed in any desired way, one example only being to cast them of ductile iron and then to machine them into the shape shown wherein they closely interfit from the fulcrum plane 19 outwardly so that the adjacent surfaces 21 of the elements 18 substantially engage and are coplanar, without substantial slots therebetween. The individual elements 18 therefore have a cross-sectional shape as sectors of one-third of the circle represented by the entire cross section of the forward end of the arbor.

The elements 18 are individually finished to provide rearwardly projecting aprons 22 and when the device is to function as a collet as well as an arbor, the aprons 22 are given a conical surface, as at 12. Forwardly of the aprons 22 the elements 18 are provided with mating internal recesses 23 which collectively form a ball seat 24 in which may be located a fulcrum ball 25, the axis of the ball lying in the fulcrum plane 19 to provide a definite interior fulcrum about which the segments 18 rotate to expand the arbor.

Figure 2:
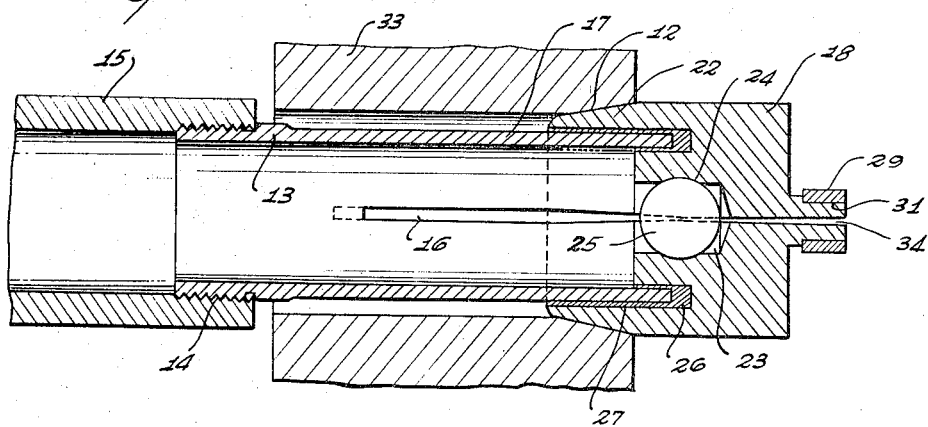
FIGURE 2 is a longitudinal sectional view of an arbor according to the present invention carried by a drawbar and a conventional spindle and with a workpiece held thereon.

The elements 18 are provided with arcuate recesses 26 around the internal recesses 23 and the opening toward the rear, which mate to form a combined annular recess which receives the forward ends of the fingers 17. The elements 18 are mounted on the supporting tube 13 by inserting a copper ring in the bottom of the annular recess formed by the individual arcuate recesses 26 and pressing the forward ends of the fingers 17 into this annular recess and then heating the assembly in a furnace to copper braze each finger 17 of the tube 13 to its individual elements 18 within its recesses 26, as at 27, FIGURE 2. Each element 18 thus becomes an integral continuation of its associated finger 17 and is individually movable therewith.

Figure 3:
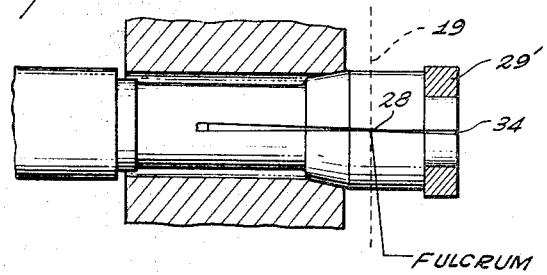
FIGURE 3 is a view similar to FIGURE 2 on a reduced scale and with the arbor shown in elevation to indicate its operation without the internal fulcrum ball.

When the fulcrum ball 25 is to be used, it may be pressed into place from the interior of the tube 13 by spreading the elements 18 apart as it is inserted. Alternatively, the ball may be omitted and the elements 18 rotated about the rear lines of engagement between their mating surfaces 21, which lines also lie in the fulcrum plane 19, as shown at 28 in FIGURE 3. The assembled arbor is shown in perspective in FIGURE 1 as a blank to be used with workpieces having various sized bores, one being shown at 29 having a bore 31. To use the arbor with any particular workpiece, the end thereof is machined to an exterior diameter slightly less than the workpiece bore. For this purpose, the elements 18 may be rigidly gripped in a collet or headstock while the end of the arbor is being machined or turned to a diameter 32. Due to the fact that the mating surfaces 21 of the elements 18 are in substantial contact, as shown in FIGURE 1, the end of the arbor may be rigidly gripped in the machine tool with the surfaces 21 positively engaged so that the arbor is rigidly held while being turned to the desired end dimension.

Figure 4:
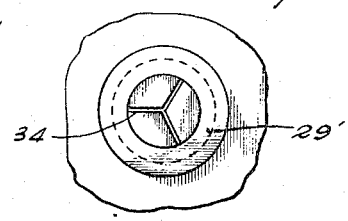
FIGURE 4 is an end view of the work holding arbor.

In operation, the arbor may extend through a rotating spindle 33 with the collet face 12, where used, cooperating with the forward internal surface of the spindle to force the fingers 17 toward each other as the drawbar 15 pulls the arbor rearwardly with a workpiece 29 on the forward end of the arbor. The fingers 17 are thus bent intermediate their ends between the unslotted portion of tube 13 and the fulcrum plane 19. The rear ends of the elements 18 will therefore be moved together with the elements pivoting in the fulcrum plane 19, with or without the ball 25, to spread the forward ends of the elements 18 into clamping engagement with the bore 31 of the workpiece 29. The mating surfaces 21 of the elements 18 thereby separate slightly, as shown at 34 in FIGURES 2, 3 and 4.

Because the mating surfaces 21 of the elements 18 are in substantial engagement, the forward end of the arbor may be machined to very small dimensions to accommodate workpieces of very small internal dimensions. At the same time, the slot in back of the fulcrum plane 19 may be relatively wide so that there is no possibility of its closing sufficiently for the segments to touch and restrict proper expansion of the outer end of the arbor.

It will be understood that the end of the arbor may be machined into varied shapes to accommodate irregular inside configurations of the workpiece, the rigidity of the mounting of the engaged elements 18 facilitating the machining operation.

While certain preferred embodiments of my invention have been specifically illustrated and described herein, it will be understood that my invention is not limited thereto, as many variations will be apparent to those skilled in the art, and the invention is to be given its broadest interpretation within the terms of the following claims.

I claim:

1. An expanding arbor comprising: a rear supporting tube having its forward portion longitudinally slotted to provide a plurality of individual, substantially resilient fingers projecting forwardly from an annular back portion of the tube; a forward element individual to each of said fingers and individually integrally bonded thereto, said forward elements having cross sections which are substantially sectors of the same circle and mating planar surfaces without substantial gaps therebetween, the inner ends of said mating surfaces forming fulcrum lines in a substantially common fulcrum plane; and integral forward end portions on said elements which combine to conform to the internal surface of the workpiece to be mounted thereon whereby compression of said resilient fingers rearwardly of the fulcrum plane is accompanied by tilting the elements in the fulcrum plane to expand their forward ends into internal gripping engagement with a workpiece mounted thereon.

2. The expanding arbor defined in claim 1 in which said elements are provided with mating internal recesses providing a ball seat; and a fulcrum ball mounted in the ball seat with its axis lying in the fulcrum plane of the arbor elements.

3. The expanding arbor defined in claim 1 in which said elements have rearwardly directed arcuate recesses in which the forward ends of the resilient tubular fingers are brazed.

4. The expanding arbor defined in claim 1 in which said elements have rearwardly directed substantially conical surfaces adapted to cooperate with a machine part to supply a collet function, said surfaces being located substantially back of the fulcrum plane of the arbor.

5. The arbor defined in claim 1 in which the said element mating surfaces engage solidly under the action of a collet or like machine part to rigidly hold the arbor in a machine tool for machining operations on its work holding end.

6. The expanding arbor defined in claim 1 in which the forward faces of said elements form a substantially continuous planar surface with substantially only line separation between the elements to permit machining of the work holding end of the arbor to small dimensions.

7. The expanding arbor defined in claim 6 in which the slots separating the fingers and elements in back of the fulcrum plane are relatively wide to insure adequate separation of the work holding end of the arbor, even though the spacing between the mating faces of the elements forwardly of the fulcrum plane is minimal.

References Cited
UNITED STATES PATENTS

| | | | |
|---|---|---|---|
| 2,459,453 | 1/1949 | Rieber | 279—2 |
| 2,460,414 | 2/1949 | Fuller | 279—2 |

LESTER M. SWINGLE, *Primary Examiner.*

E. A. CARPENTER, *Examiner.*